United States Patent [19]
Rickard

[11] Patent Number: 4,875,066
[45] Date of Patent: Oct. 17, 1989

[54] PHOTOGRAPHY SHADE AND VIGNETTER

[76] Inventor: Martin R. Rickard, N. Park Ave. Extension, Box C, New Sharon, Iowa 50207

[21] Appl. No.: 200,560

[22] Filed: May 31, 1988

[51] Int. Cl.⁴ ............................................. G03B 11/00
[52] U.S. Cl. .................................................. 354/296
[58] Field of Search ........................ 354/287, 295, 296

[56] References Cited
U.S. PATENT DOCUMENTS

| | | | |
|---|---|---|---|
| 1,137,975 | 5/1915 | Howard | 354/296 |
| 4,124,859 | 11/1978 | Huber | 354/296 |
| 4,506,964 | 3/1985 | Hagles | 354/296 X |

Primary Examiner—L. T. Hix
Assistant Examiner—Brian W. Brown
Attorney, Agent, or Firm—Zarley McKee, Thomte, Voorhees & Sease

[57] ABSTRACT

A photographic shade and adjustable vignetter assembly are provided for selective vignetting effects. The assembly includes a shade which is attachable to a camera lens and a vignetter adjustably mounted within the shade for holding a vignette. The vignetter and vignette can be rotated within the shade, moved upwardly and downwardly within the shade, and moved forwardly and rearwardly within the shade, as desired.

16 Claims, 3 Drawing Sheets

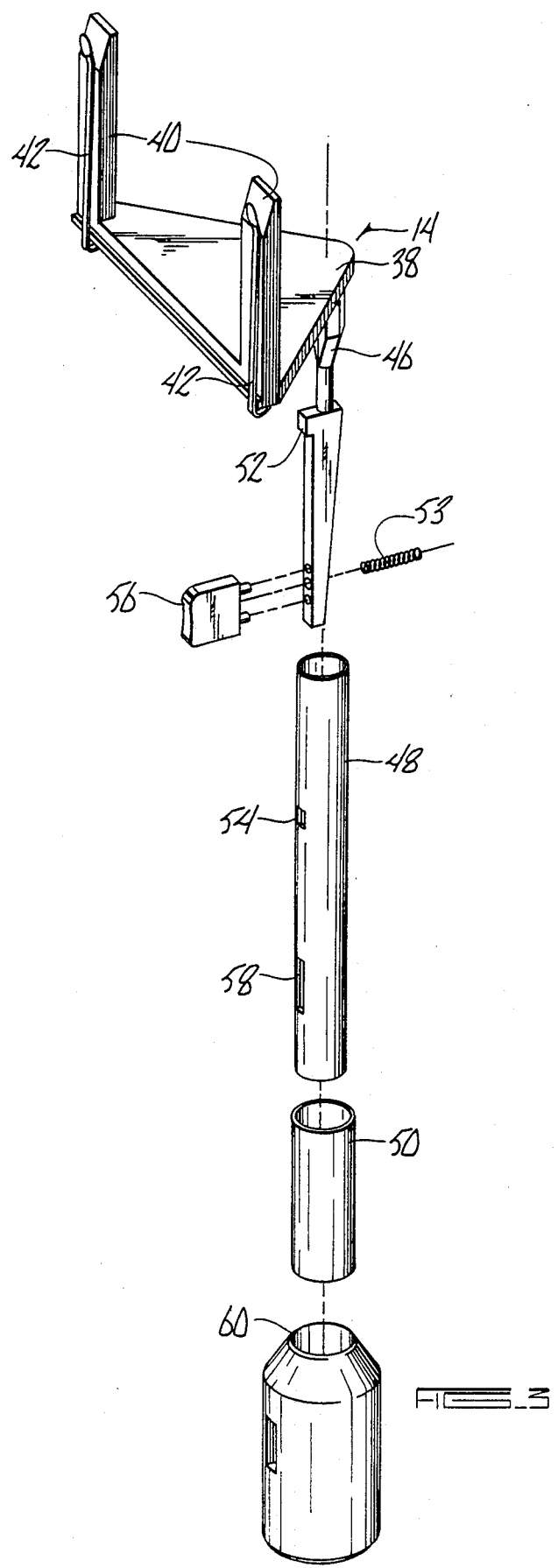

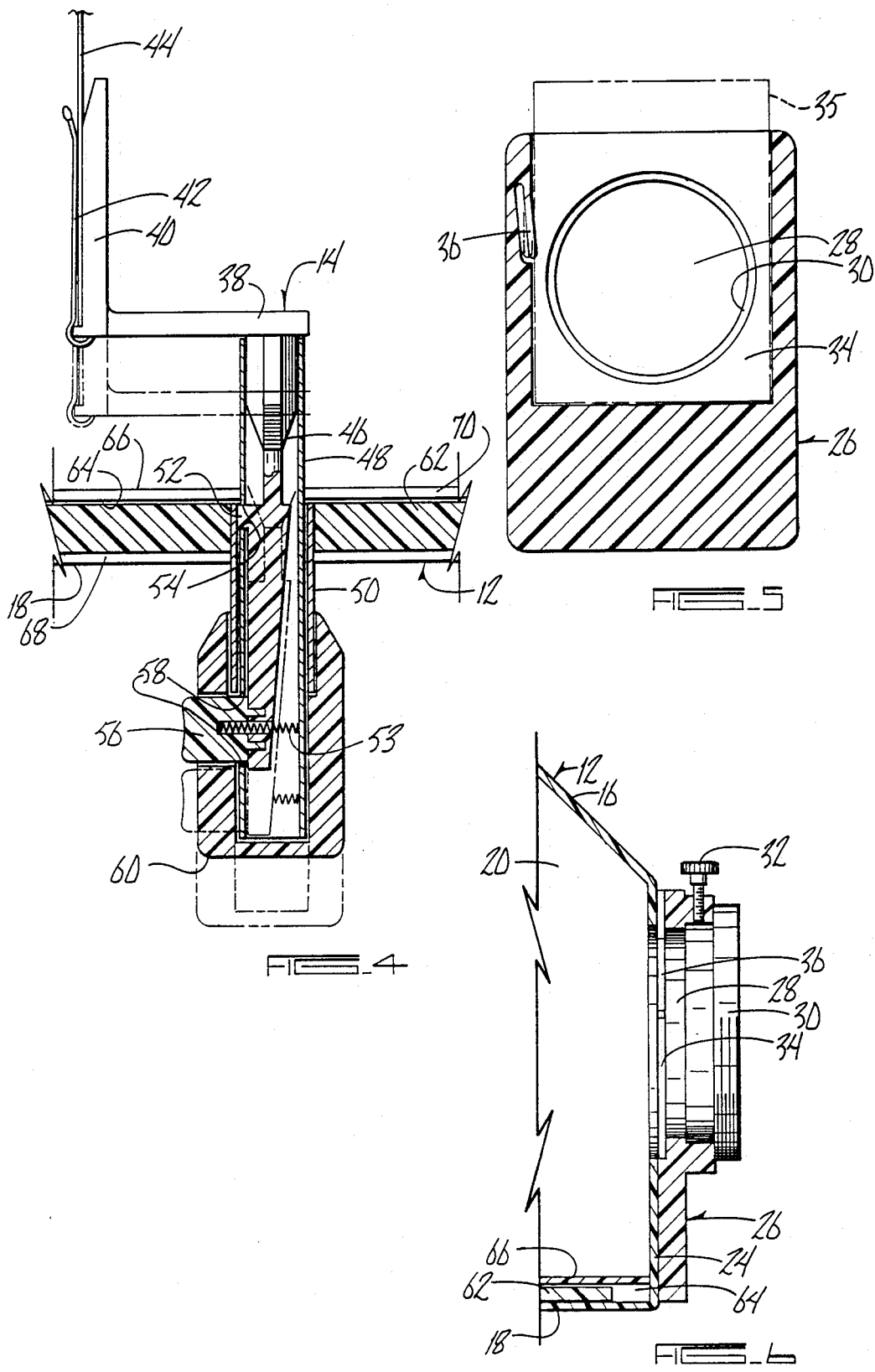
FIG_5
FIG_4
FIG_6

4,875,066

PHOTOGRAPHY SHADE AND VIGNETTER

BACKGROUND OF THE INVENTION

Vignetting of photographs is a well-known procedure in photography. Vignetters are commercially available which are both shaded and unshaded. While shaded vignetters are preferable, conventional shaded vignetters do not allow movement of the vignette.

Therefore, a primary objective of the present invention is the provision of a shaded vignetter which allows for selectively adjustable positioning of the vignette within the shade.

Another objective the present invention is the provision of an improved vignetter which has substantially universal movement within a shade.

Another objective of the present invention in the provision of an adjustable shaded vignetter which is economical to manufacture and durable in use.

These and other objectives will become apparent from the following description of the invention.

SUMMARY OF THE INVENTION

The present invention is directed towards a photographic shade and vignetter assembly. The shade includes upper and lower walls and opposite side walls which are interconnected to form an enclosure, with an open forward end and a rearward end adapted to be mounted on a camera lens. A vignetter is mounted in the shade for selective adjustable movement to desired positions.

More particularly, the shade includes a slide channel extending along either the upper wall or lower wall thereof, with a slide bar slidably mounted therein. An elongated shaft extends through the slide bar and a corresponding slot in the shade wall. A vignetter frame is mounted on the interior end of the shaft and a control handle is mounted on the exterior end of the shaft. The vignetter frame is adapted to hold a vignette.

The shaft is rotatable about its axis, thereby allowing rotation of the vignetter frame and vignette. The shaft is also movable in a vertical direction through the slide bar, such that the vignette is vertically adjustable. The slide bar allows forward and rearward movement of the vignette. A releasable friction stub is provided for locking the shaft against rotational and vertical movement.

BRIEF DESCRIPTION OF THE DRAWINGS

FIG. 3 is an exploded view of the vignetter assembly.

FIG. 4 is a sectional view taken along lines 4—4 of FIG. 2.

FIG. 5 is a sectional view taken along lines 5—5 of FIG. 2.

FIG. 6 is a sectional view taken along lines 6—6 of FIG. 2.

DETAILED DESCRIPTION OF THE INVENTION

Figure 1:
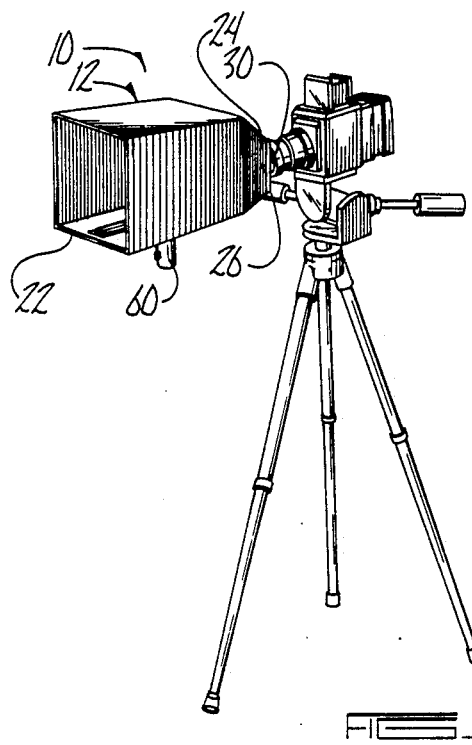
FIG. 1 is a perspective view of the shade and vignetter assembly of the present invention, as mounted on a camera.
Figure 2:
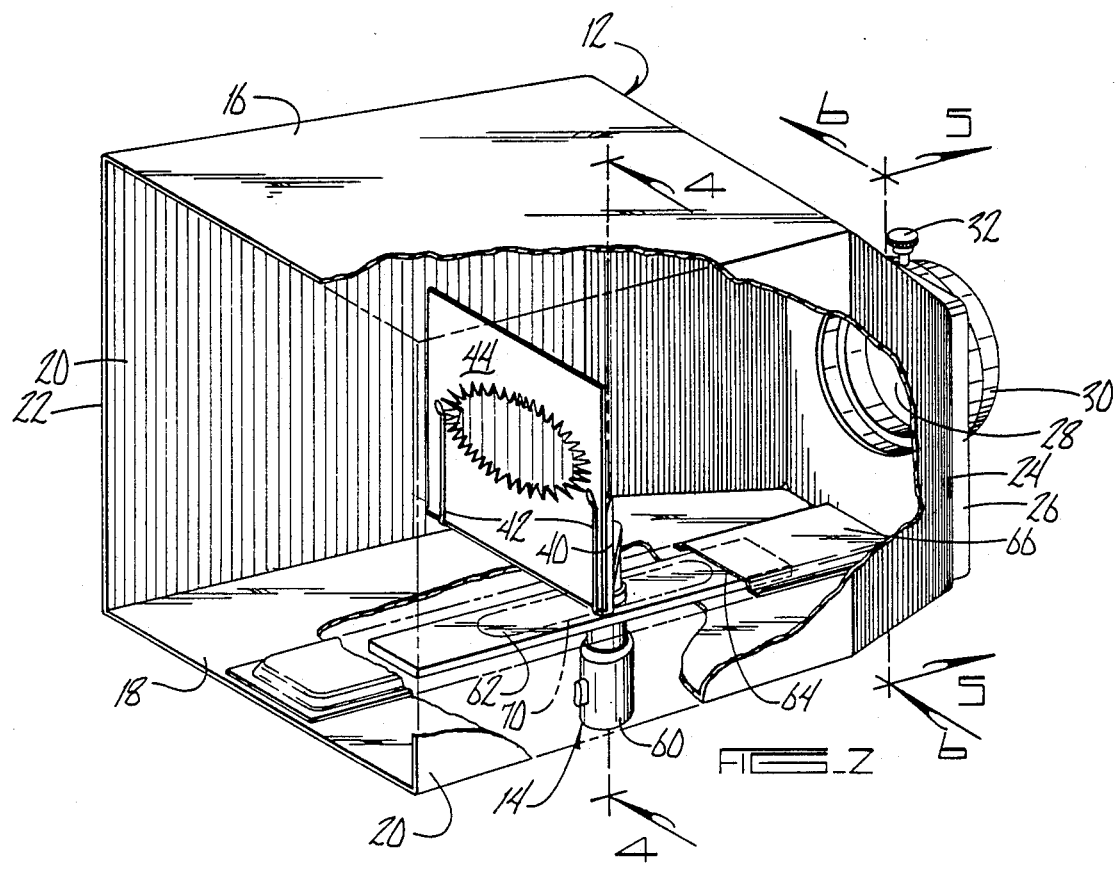
FIG. 2 is a perspective view of the shade and vignetter assembly of the present invention, with portions broken away for clarity.

The shade and vignetter assembly is generally designated in the Figures by the reference numeral 10. Basically, assembly 10 includes a shade 12 and a vignetter 14 adjustably mounted within the shade.

More particularly, shade 12 includes an upper wall 16, a lower wall 18 and opposite side walls 20. The front end 22 of shade 12 is open and the rear end 24 is provided with an adapter plate 26. The adapter plate has an opening 28 for receiving an adapter ring 30, for mounting the shade onto a camera lens. A thumb screw or set screw 32 secures ring 30 within opening 28.

The forward face of adapter plate 26 includes a recessed area 34 adapted to receive a lens filter 35. A resilient friction tab 36 extends into the recessed area from at least one side of adapter plate 26 for frictionally holding the lens filter in place.

Vignetter 14 includes a base 38 with a pair of arms 40 extending upwardly therefrom. Resilient clips 42 are normally biased against arms 40 for holding a vignette 44 therebetween.

As best seen in FIG. 3, base 38 is mounted in a stem 46 which extends into a stem tube 48. Stem tube 48 is slidably mounted within a larger guide tube 50 such that stem tube 48 and the interconnected vignetter stem, base, arms and clips are rotatable about the axis of tube 48 and vertically slidable with respect to guide tube 50. FIG. 4 shows vignetter 14 in a raised position (solid lines) and a lower position (broken lines). Stem 46 includes a friction stub 52 which protrudes through an opening 54 in stem tube 48 for frictionally engaging the interior surface of guide tube 50 and thereby holding the vignetter in the desired rotational and vertically movable position. Friction stub 52 is normally biased into frictional engagement with guide tube 50. A spring 53 may also be employed for further biasing of stub 52. A release button 56 on stem 46 extends through a second opening 58 and through a corresponding opening in a control handle 60 mounted on stem tube 48. Release button 56 can be depressed to disengage friction stub 52 from contact with the interior of guide tube 50 and thereby allow easy rotational and vertically slidable movement of the vignette.

Guide tube 50 is secured to a slide bar 62, which in turn is slidably mounted within a slide channel 64 formed in shade 12. The slide channel can be formed in any convenient manner. In the drawings, slide channel 64 is defined by lower wall 18 of shade 12 and a slide cover 66 secured to the lower wall 18 with a portion spaced above the floor 18 to provide space for sliding movement of slide bar 62. A slot 68 is provided in lower wall 18 and a corresponding slot 70 is provided in slide cover 66 to allow forward and rearward sliding movement of slide bar 62 and the interconnected guide tube 50, stem tube 48, and vignetter 14.

In operation, assembly 10 is mounted on a camera lens via adapter ring 30. Vignette 44 is secured between clips 42 and arms 40. The object to be photographed is positioned in front of assembly 10 and vignetter 14 is adjusted to a selected position. The vignetter can be rotated about the axis of stem tube 48, moved upwardly or downwardly along the axis of guide tube 50, or moved forwardly and rearwardly along the axis of slide channel 64. The adjustability of the vignetter within the shade allows for varying vignetting effects on the photograph.

From the foregoing, it can be seen that the present invention accomplishes at least all the stated objectives.

What is claimed is:

1. A photographic shade and adjustable vignetter assembly comprising:

a shade having an open forward end, a rearward end, an upper wall, a lower wall, and opposite side walls, the walls being interconnected to form an enclosure, attachment means on the rearward end of the shade for releasably attaching the shade to a camera lens;

a vignetter mounted within the shade enclosure for holding a vignette; and mounting means for adjustably positioning the vignetter within the shade enclosure, the mounting means allowing forward, rearward, upward, downward and rotational movement of the vignetter within the shade enclosure and with respect to the lens.

2. The assembly of claim 1 wherein the mounting means includes a shaft rotatably extending through one of the shade walls with an axis for pivotal movement of the vignetter about the axis.

3. The assembly of claim 2 wherein the mounting means includes a lock for holding the vignetter in a selected position with respect to the axis.

4. The assembly of claim 1 wherein the mounting means includes a shaft slidably extending through one of the walls of the shade for adjustable vertical movement of the vignetter.

5. The assembly of claim 4 wherein the mounting means includes a lock for holding the vignetter in a selected vertical position.

6. The assembly of claim 1 wherein the mounting means includes sliding means on one of the walls of the shade for moving the vignetter forwardly and rearwardly.

7. The assembly of claim 6 wherein the sliding means includes an elongated slide channel extending forwardly and rearwardly along one of the upper or lower walls of the shade and a slide bar slidably positioned within the slide channel, the vignetter being operatively connected to the slide bar such that the vignetter is movable forwardly and rearwardly.

8. The assembly of claim 7 wherein the mounting means further includes a shaft slidably and rotatably extending through the slide bar and having one end connected to the vignetter for rotating the vignetter and for vertically moving the vignetter.

9. The assembly of claim 1 wherein the mounting means includes a lock for holding the vignetter in a selected rotated and vertically adjusted position.

10. The assembly of claim 9 wherein the mounting means includes a shaft having one end extending through one wall of the shade and into the shade enclosure and, an opposite end extending outside of the shade enclosure on which a control handle is mounted for gripping by an operator for moving the vignetter to a selected position within the shade enclosure.

11. The assembly of claim 10 wherein the control handle includes a release button for deactuating the lock.

12. The assembly of claim 1 wherein the attachment means includes an adapter plate secured to the rearward end of the shade, and adapted to be connected to the camera lens.

13. The assembly of claim 12 wherein the adapter plate has a slot therein for receiving a filter and a friction tab extending into the slot to frictionally engage the filter.

14. A method of shading and vignetting a photograph, comprising:

mounting a shade on a camera lens, the shade having a movable vignetter adjustably positioned therein;

placing a vignette in the vignetter;

positioning the object to be photographed in front of the camera;

adjusting the spacing between the lens and the vignette by moving the vignetter forwardly or rearwardly within the shade;

adjusting the height of the vignetter with respect to the lens by moving the vignetter upwardly or downwardly within the shade;

adjusting the angle of the vignette with respect to the lens by rotating the vignetter within the shade; and actuating the camera to expose film for producing a vignetted photograph of the object.

15. The method of claim 14 wherein adjustment of the position of the vignetter and vignette includes rotational movement within the shade.

16. The assembly of claim 1 further comprising a handle operatively connected to the vignetter, the handle being located outside of the shade enclosure and being adapted to control from outside the shade enclosure the forward, rearward, upward, downward, and rotational movement of the vignetter within the shade enclosure.

* * * * *